Sept. 5, 1961  W. D. DIEMER ET AL  2,998,665
COUPLING STRUCTURE FOR SLIDE PROJECTOR TRAYS
Filed Oct. 30, 1957  2 Sheets-Sheet 1
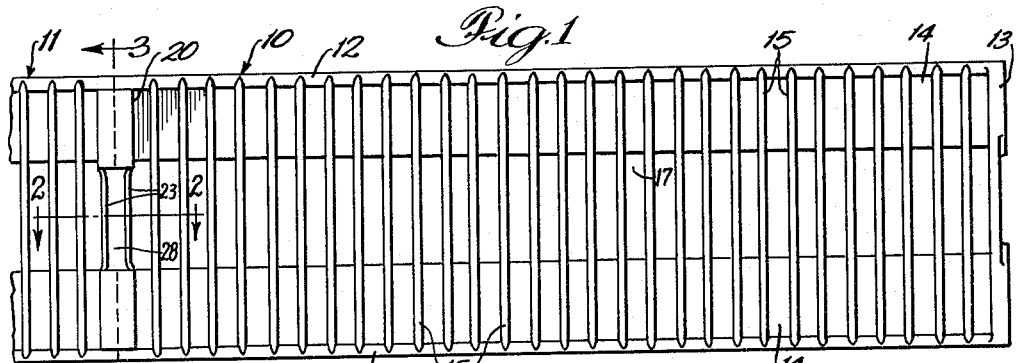
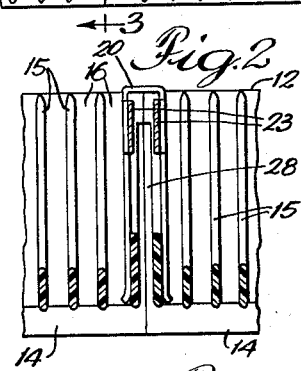
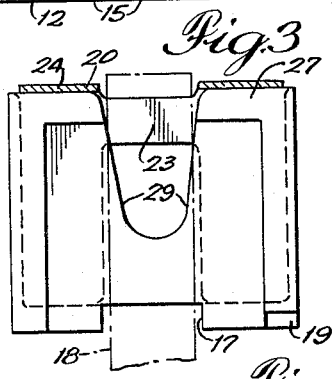
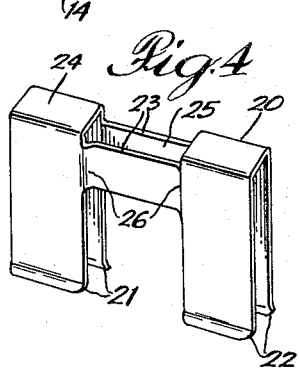
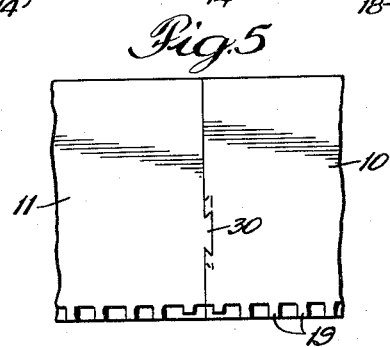
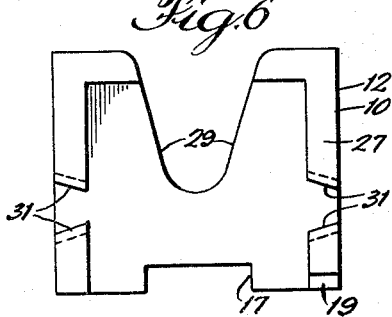
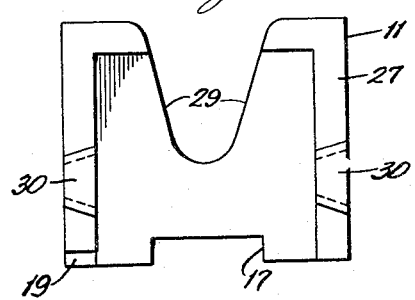
INVENTORS:
William D. Diemer
and Robert A. Skyer,
BY Dawson, Tilton, Fallon & Lungmus,
ATTORNEYS.

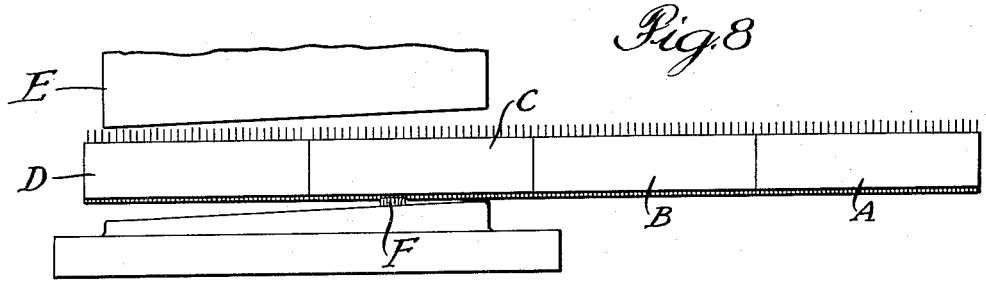
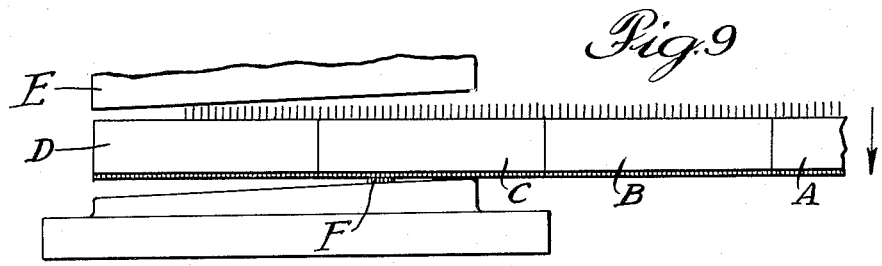
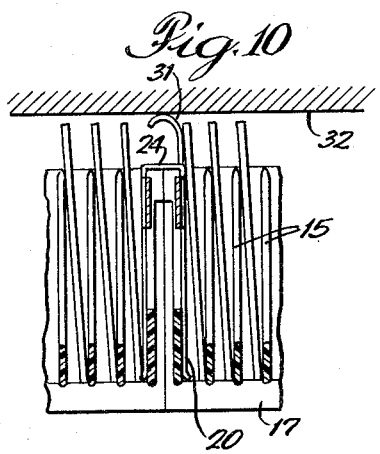
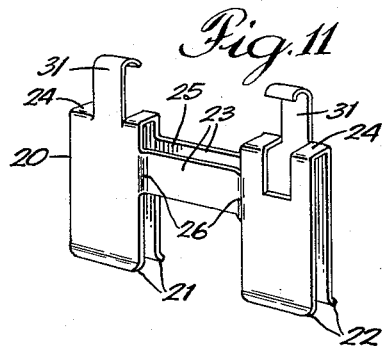

United States Patent Office 2,998,665
Patented Sept. 5, 1961

2,998,665
COUPLING STRUCTURE FOR SLIDE
PROJECTOR TRAYS
William D. Diemer, 5132 Greenwood, Chicago 15, Ill., and Robert A. Skyer, 1709 Greenleaf, Chicago 26, Ill.
Filed Oct. 30, 1957, Ser. No. 693,335
4 Claims. (Cl. 40—79)

This invention relates to trays for automatic slide projectors, and more specifically, to coupling means for connecting such trays so that the slides carried thereby may be successively projected in a substantially continuous operation.

In the operation of automatic slide projectors, a tray of slides or mounted film transparencies is automatically advanced through the machine while a synchronized ejector arm sequentially ejects each of the slides and moves them into and out of projecting positions. As the reciprocable arm executes its return stroke, each projected slide drops or is urged back into its tray pocket and the tray is then advanced for the projection of the next slide in the series. Some projectors are provided with remote controls which allow the person presenting the slides to stand at a distance from the machine, usually near the projection screen, for controlling the action of the ejector arm and for varying the duration of each successive slide projection.

Since the trays are ordinarily used for storing the slides when the projectors are not in use, it is desirable to limit the capacity of each tray to about thirty slides so that the trays will be of proper size for ease of handling and storage. However, this has the disadvantage of also limiting the number of slides which may be shown without requiring an interchange of trays. Obviously, where a program must be interrupted for the insertion of new trays into the projection machine the continuity of the presentation will suffer. Thus, even where the projector is equipped with remote controls, it is usually necessary or desirable to employ the services of an assistant for manipulating and inserting successive trays of slides into the machine.

Therefore, one of the main objects of the present invention is to overcome the aforementioned defects and disadvantages of present tray construction and projector operation. More specifically, it is an object of the present invention to provide means for connecting slide projector trays together so that they may be joined in series for continuous slide presentation and may be easily uncoupled for transportation and storage. Another object is to provide a structure for locking successive trays in longitudinal alignment in such a way that the coupling means will not interfere with the operation of the advancing or ejecting mechanism of a projector. In this connection, it is a specific object to provide a connecting structure which holds the trays securely together so that they will not shift out of longitudinal alignment during a slide projecting operation. A still further object is to provide clip means for securing a plurality of slide projector trays in longitudinal alignment, the clip means being provided with pressure members engageable with the magazine of a projector to maintain the interconnected trays in operative engagement with the tray-driving means.

Other objects will appear from the specification and drawings in which:

FIGURE 1 is a broken top plan view of a pair of slide trays equipped with coupling means embodying the present invention; FIGURE 2 is a broken longitudinal section taken along line 2—2 of FIGURE 1; FIGURE 3 is a cross section taken along line 3—3 of FIGURE 1; FIGURE 4 is a perspective view illustrating the clip for connecting the slide carrying trays; FIGURE 5 is a broken side elevation of a pair of slide trays equipped with connecting means comprising a second embodiment of the invention; FIGURE 6 is an end view of one of the trays illustrated in FIGURE 5; FIGURE 7 is an end view of the other connecting tray illustrated in FIGURE 5; FIGURE 8 is a somewhat simplified side elevation of interconnected slide trays carried by the magazine of a slide projector and illustrating a specific problem which may be encountered when the embodiments of FIGURES 1–7 are used in conjunction with certain projectors; FIGURE 9 is similar to FIGURE 8 and illustrates possible conditions when the last tray of a series is only partially filled; FIGURE 10 is a broken longitudinal section of a pair of slide trays equipped with modified coupling means; and FIGURE 11 is a perspective view of the modified clip illustrated in FIGURE 10.

Referring to the drawings, the numerals 10 and 11 generally designate a pair of elongated slide trays suited for use in automatic slide projectors. The trays are preferably molded from polystyrene or any other suitable plastic material and are each provided with side walls 12, end walls 13 and a centrally-slotted bottom wall 14. Between the end walls of each tray are a plurality of uniformly spaced transverse partitions 15 which define a series of vertical pockets 16. In the illustration given each tray is provided with a series of thirty such pockets for carrying a like number of film slides, although it is to be understood that trays having a greater or smaller number of slide pockets may be provided.

The central longitudinally extending slot 17 in the bottom wall of each tray permits the ejector arm 18 of an automatic slide projector to travel upwardly into each of the pockets 16 for ejecting the slides and moving them into the projecting position. Arm 18 reciprocates in synchronization with a geared drive wheel (not shown) of an automatic slide projector which is adapted to engage uniformly spaced teeth 19 disposed along one of the lower longitudinal edges of each tray (FIGURE 5). After projection, each slide is brought back into its respective pocket as the reciprocable ejector arm executes its downward or return stroke. Thus, in the operation of an automatic slide projector, the slides carried within the pockets are consecutively ejected and replaced as the slide tray is automatically advanced. Since the operation and structure of such projectors is well known, a further description of such operation is believed unnecessary for purposes of disclosing the present invention.

In the embodiment illustrated in FIGURES 1 through 4 of the drawings, a pair of slide trays are detachably secured in longitudinal alignment by a spring clip 20. This clip may be formed of spring steel or any other suitable material having similar properties and, as illustrated most clearly in FIGURE 2, has an inverted U-shaped cross section. Each of the depending portions of the inverted U is recessed to provide a pair of depending lateral arms 21 and 22 abridged by an upper portion 23 extending therebetween. In FIGURE 4 it will be seen that horizontal upper portion 24 of the clip is provided with an intermediate opening or recess 25 disposed between the spaced connecting portions 23. For reasons which will appear shortly, the clip is crimped along spaced vertical lines 26 extending between the connecting portions 23 and the depending arms 21 and 22 so that the connecting portions are spaced more closely than the corresponding arms.

The end walls 13 of each tray are provided with peripheral flanges 27 extending along the side and top edges thereof. These flanges provide smooth, flat outer surfaces for abutting engagement with the corresponding flanges of other trays arranged in axial alignment therewith, and serve to reinforce the end walls of each tray. Furthermore it will be noted that when the end flanges of a pair of trays are brought into surface contact, a space or cavity 28 is defined between the end walls of the aligned trays (FIGURE 2). At the top of each end wall, flanges 27 are interrupted by a tapered central recess or cut-out 29 which extends downwardly through the end wall. Thus, when the trays are arranged in end-abutting relation, cavity 28 is exposed from both the top and the bottom. Since no flanges are provided along the lower edges of the end walls, the slide ejector arm 18 may pass upwardly and downwardly through the cavity 28 between the end walls of the aligned trays.

Preferably, the lower ends of the opposing pairs of arms 21 and 22 are turned outwardly, as shown in FIGURES 2 and 4, to facilitate insertion and removal of the clip. If desired, the opposing arms of the U-shaped clip may converge slightly, thereby insuring a tight frictional engagement with the inner faces of end walls 13 when the clip is in mounted condition.

Since the slide-carrying trays are generally of conventional size and shape, they may be easily handled and stored away when the slide projector is not in use. The limited size of the trays has the further advantage that each tray may contain a selected number of slides devoted to a particular subject or event. Then, when the slides of two or more trays are to be shown, the selected trays are arranged in end-abutting relation and clips 20 are slipped over the adjacent end walls of the aligned trays to hold them securely together. The coupled trays may then be inserted as a unit into the tray-advancing carriage of a slide-projector and the advancing mechanism will move the trays forwardly as an integrated structure.

Since clip 20 has substantially the same width as pockets 16, the clip effectively prevents relative lateral displacement of the coupled trays. Relative longitudinal movement or separation of the connected trays is prevented by the tension of the spring arms which tightly engage the inside surfaces of end walls 13. Consequently, the trays are locked tightly together when the clip or clips are in place and, at the same time, may be easily disconnected for transportation or storage by simply lifting the U-shaped clips free from engagement with the end walls of the trays.

As previously explained, the trays are adapted for automatic advancement within a slide projector. Since the clip is formed from thin sheet metal, the spring arms occupy little space within the end pockets of the connected trays and do not interfere with the insertion and removal of slide transparencies in connection with those pockets. Furthermore, since the connecting portions 23 of the crimped clip lie within the tapered recesses or cut-outs 29 in the adjacent end walls 13, these connecting portions will not obstruct or interfere with reciprocal movement of the ejector arm as it travels into and out of the end pockets of the connected trays.

When the ejector arm 18 withdraws from the last pocket of a tray adjacent to clip 20 the trays are automatically advanced and the upwardly moving arm enters the cavity between the flanged end walls of the connected trays. Here again, the clip will not obstruct movement of the reciprocable arm since the connecting portions are spaced apart a distance slightly greater than the thickness of the arm. Therefore, the arm simply executes a free stroke passing upwardly and then downwardly through the cavity 28 and the opening 25 at the top of the clip. When the coupled trays are again advanced, arm 18 will travel into the first pocket of the next tray for ejecting a film slide contained therein.

While the invention has been described in connection with a slide projector in which the slide trays are oriented with their pockets facing upwardly, it will be understood that this invention is also adapted for use in conjunction with machines which advance the trays in a tilted condition, or which have horizontally movable ejector arms for ejecting the slides from trays lying upon their side walls.

In the embodiment illustrated in FIGURES 5 to 7, the trays 10 and 11 are identical to those already described except that the end flanges at one end of each tray are provided with tapered locking tabs or members 30 which project longitudinally beyond the flanges, and the end flanges at the opposite end of the tray are provided with slots 31 for receiving the locking members provided by the flanges of an adjacent tray. As shown in FIGURE 6, the slots are arranged in pairs and are laterally tapered in the same direction. In addition, the walls of the slots or notches as defined by the flanges converge as they extend away from the end wall. The complementary locking members are laterally tapered in the same direction as the slots and have upper and lower surfaces which diverge as they extend away from the tray's end wall. Thus, the slide trays may be locked together by simply inserting the tapered locking members of one tray into the complementary notches provided by the end flanges of another tray. Preferably, each tray is provided with male and female parts at its respective ends so that a number of such trays may be connected in series.

Normally, several slide trays may be joined by either the clip means illustrated in FIGURES 1–4 or the connecting means shown in FIGURES 5–7 and will pass through the magazine of a slide projector without difficulty. This is true even where three or more trays are interconnected and where the chain of trays necessarily extends a substantial distance either behind the projector at the commencement of a projecting operation or in front of the machine as the last slides are being projected. However, in some cases where the tray-supporting track of the projector is relatively short or where the vertical dimensions of the tunnel are substantially greater than the height of the filled trays, the weight of the overhanging trays may tend to cant the chain and interfere with proper engagement between the drive gear and the teeth of the trays. This condition is illustrated in somewhat exaggerated form in FIGURE 8 where it will be seen that the unsupported weight of the foremost trays A, B has lifted the remaining trays C, D away from the track of projector E, thereby preventing a proper intermesh between drive gear F and the slide trays. This canting effect is increased as the last tray is moved forwardly through the tunnel, or as illustrated in FIGURE 9, where the last tray of the series is only partially filled with slides.

The modified clip structure shown in FIGURES 10–11 is identical to the structure already described with reference to FIGURES 1–4 except that a pair of spring pressure members or fingers 31 project upwardly from the arms 21, 22 and above the horizontal upper portions 24 of clip 20. These arms may be formed integrally with the spring clip and are curved at their upper free ends so that they will slide smoothly along the roof 32 of the tunnel of a slide projector, thereby maintaining the lower portions of the trays in operative engagement with the drive gear. It will be noted that each of the inverted J-shaped pressure members face in opposite directions to insure proper contact with the tunnel roof regardless of the direction of longitudinal movement of the interconnected trays. The curved free end portions of each of the members is disposed directly above a horizontal portion 24 of the clip so that it will not interfere with the ejection of slides carried by the pockets adjacent to the clip.

In addition to maintaining the trays and drive gear in engagement by restraining tipping of the tray chain, it is also apparent that the integral pressure members prevent contact between the slides of the trays and the tunnel roof. As a result, these members serve to protect the slides from wear and possible damage during a projecting operation.

While we have disclosed several embodiments of the present invention in considerable detail for purposes of illustration, it will be understood by those skilled in the art that many of these details may be varied without departing from the spirit and scope of the invention.

We claim:

1. In combination, a pair of elongated slide trays each having a series of pockets for containing film slides and having end walls provided with peripheral flanges, the peripheral flanges at one end of one of said trays being adapted to abut the corresponding peripheral flanges at one end of the other of said trays to provide a cavity between the adjacent end walls, said flanges being interrupted along the top and bottom edges of said end walls to permit movement of an ejector arm into and out of said cavity, and connecting means for detachably securing said corresponding flanges in abutting relation and for holding said trays in longitudinal alignment to provide a rigid multiple tray unit for use in connection with a slide projector, said connecting means comprising a detachable spring clip having spring arms engageable with the adjacent end walls of said trays for clamping said flanges in abutting relation and being engageable with the side walls of said trays for preventing relative lateral displacement thereof, said clip being provided with at least one upstanding pressure member for slidably engaging the tunnel roof of a slide projector.

2. In combination with a pair of elongated slide trays having flanged end walls engageable with each other when said trays are connected in longitudinal alignment, a detachable spring clip having a pair of spaced depending portions frictionally engageable with the inner surfaces of adjacent end walls of said trays when the trays are longitudinally aligned for clamping said adjacent end walls together, said clip being provided with a central opening in the top portion thereof for permitting unrestrained movement of slide ejection means between the flanged end walls of a pair of connected trays and through the top portion of said clip, said clip also being provided with at least one upstanding pressure member slidably engageable with the tunnel roof of a slide projector.

3. A spring metal clip for securing slide trays in longitudinally-aligned, end-abutting relation, said clip having a horizontal top portion and a pair of spaced vertical portions depending therefrom, said top portion having a central opening extending vertically therethrough for permitting unrestrained movement of a slide ejector though the top portion of said clip when a pair of connected trays are advanced through a slide projector, said clip also being provided with a pair of flexible upstanding fingers each having a curved upper end disposed above the horizontal top portion of said clip for slidably engaging the tunnel roof of a slide projector and for maintaining said trays in longitudinal alignment with the tunnel.

4. A spring metal clip for securing slide trays in longitudinally-aligned, end-abutting relation, said clip having a top portion and a pair of spaced vertical depending spring portions, said top portion having a central opening to prevent movement of a slide ejector element between said depending portions and through said top portion, said clip also being provided with at least one upstanding pressure member for slidably engaging the tunnel roof of a slide projector and thereby maintaining connected trays in longitudinal alignment with said tunnel.

References Cited in the file of this patent

UNITED STATES PATENTS

| 2,756,630 | Goldberg | July 31, 1956 |
| 2,774,472 | Badalich | Dec. 18, 1956 |
| 2,790,691 | Goebel | Apr. 30, 1957 |

FOREIGN PATENTS

| 411,970 | Great Britain | June 21, 1934 |